C. T. BISHOP & R. JACKSON.
GAME SCORING DEVICE.
APPLICATION FILED APR. 2, 1908.
1,046,433.
Patented Dec. 10, 1912.
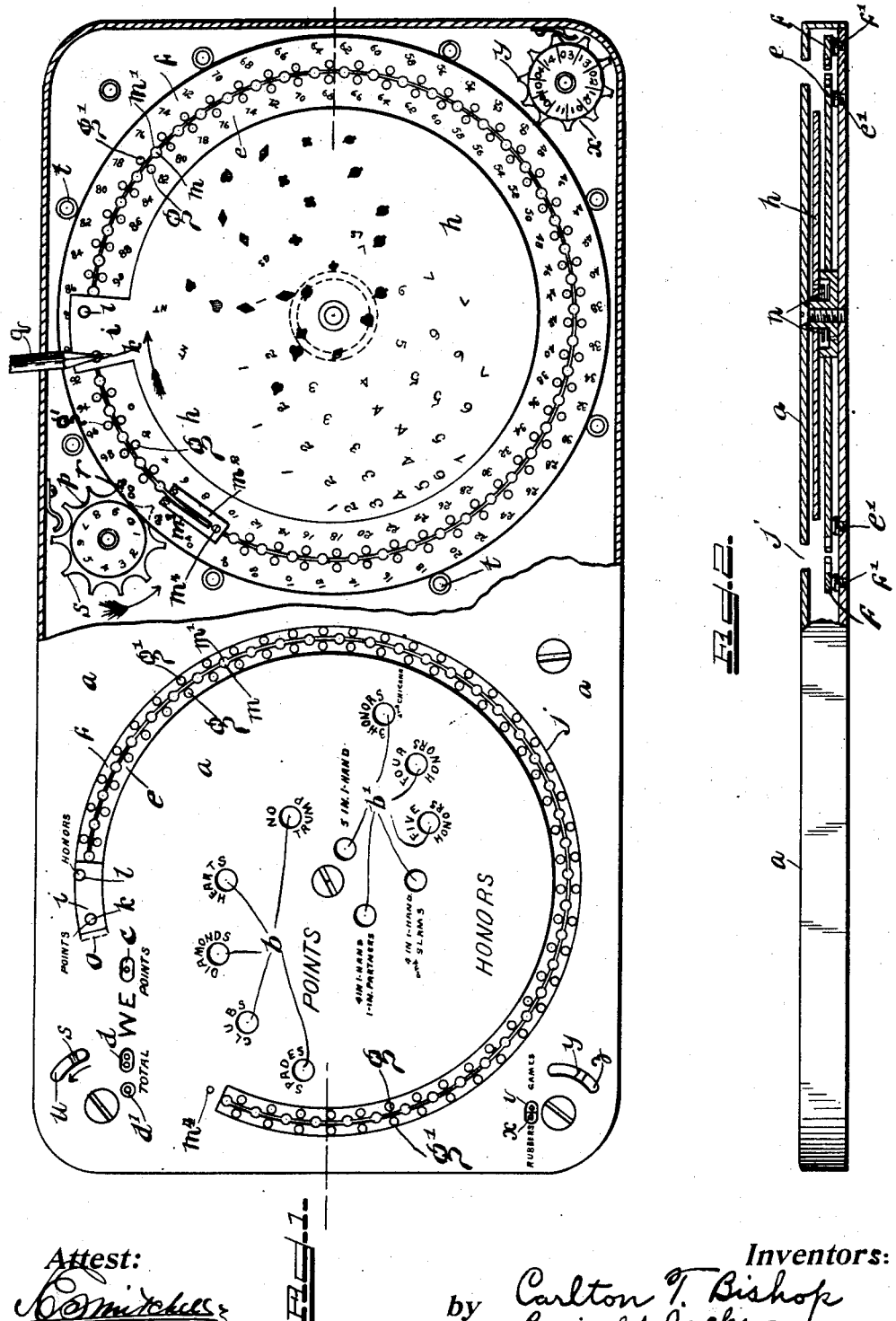
Attest:
Inventors:
Carlton T. Bishop
Reginald Jackson
by Philip Farnsworth, Atty

UNITED STATES PATENT OFFICE.

CARLTON T. BISHOP AND REGINALD JACKSON, OF SEWICKLEY, PENNSYLVANIA.

GAME-SCORING DEVICE.

1,046,433.      Specification of Letters Patent.      Patented Dec. 10, 1912.

Application filed April 2, 1908. Serial No. 424,711.

*To all whom it may concern:*

Be it known that we, CARLTON T. BISHOP and REGINALD JACKSON, citizens of the United States of America, and residents of the town of Sewickley, Pennsylvania, have invented certain new and useful Improvements in Game-Scoring Devices, the principles of which are set forth in the following specification and accompanying drawings, which disclose the form of the invention which we now consider to be the best of the various forms in which the principles of the invention may be embodied.

This invention relates to game scoring devices, the object being to provide as simple a device as possible for use in such games as cards, particularly those which present the greater difficulties in scoring, such as bridge whist, five hundred, pinochle, etc.

A particular object is to provide a device which at all times during use presents a record of total scores.

The invention consists of the features hereinafter described and claimed.

Of the drawings, which represent an embodiment of the invention especially adapted for bridge whist, by way of example, Figure 1 is a plan, partly in section at the right, and Fig. 2 is an elevation, partly in section at the right.

Two similar independently operable counters may be embodied in a single casing $a$, one for the scorer and partner "We", at the left, and one for their opponents, "They", at the right. The operating parts are shown in the preferable rotatable form, as distinguished from the permissible reciprocable form.

The device comprises, first, means for indicating and recording the value of a given hand and trick, which consists of a face-piece member which may be the top, or a part of the top, of casing $a$, and also a rotatable operating disk $h$ pivoted in casing $a$, which may be the indicating and operating member, or simply the indicating member. Disk $h$ has on its surface a plurality of series of indicating numbers, and a plurality of sets of pips of playing cards, (Fig. 1, right) all of which show through indicating openings $b$ or $b'$ in face-piece member $a$, which member may be the operating member instead of disk $h$. Some of the openings $b$, as shown, (upper part of Fig. 1, left) may represent the respective suits of the trump declaration, and through these openings appear the numbers on disk $h$ representing numbers of tricks taken, or vice versa. Certain other openings $b'$, as shown, (lower part of Fig. 1, left) represent the various combinations of honor cards which may be held, and through these openings appear the pips of the respective suits, or letter characters N T (no trumps), etc., which are marked on disk $h$, any one of which may be the trump declaration. All of these numbers and pips are prearranged on disk $h$ so as to successively appear right side up in the proper openings $b$ and $b'$. To determine the value of points or honors won in a given hand, (which is analogous to the ordinary glance at a score-card, or exercise of memory), disk $h$ (when that is the operating member) may be turned clockwise (arrow, Fig. 1, right) until any one of the numbers of a given series, representing the number of tricks won, or one of the pips or letter characters of a given series, representing the trump suit in question, appears in the correspondingly marked opening $b$ or $b'$ in face-piece member $a$. A helical spring $n$ (Fig. 2, right) is arranged to return disk $h$ (or whichever part may be the operating member as the face-piece member) to its initial position after each of its clockwise movements. No direct evidence of the value need be resultantly apparent form the clockwise operation, except by way of an accompanying automatic register thereof, as will now be described.

The invention, therefore, comprises secondly, means for registering the determined values, as follows. Rotatable concentrically with disk $h$, but below it, is a second disk or recording member $e$ (Figs. 1 and 2, right) bearing an annular series of numbers, by twos, to one hundred. This disk $e$ serves to record the number of points in any single game. When disk $e$ is rotated clockwise, these numbers appear through opening $c$ (Fig. 1, left), to indicate the number of points won on the hand being recorded, which may be in addition to the register of points previously won in the same game. The opening $c$ will therefore always show the total score in a given game. Disk $e$ is operated simultaneously with disk $h$, so that a registry will be made automatically by the operation of the indicating means, thus. Disk $e$ has an annular series of outer peripheral openings $m$; and disk $h$ has an arm $i$ having a perforation $k$ which registers with said openings m. A pointer or pencil point or button q, or an equivalent, is inserted through perforation k into one of the openings m, and then moved clockwise, an annular slot j (Fig. 1, left, and Fig. 2, right) being provided in face-piece a for this purpose. If one trick of spades is to be recorded, for example, the disks h and e are turned until the figure 1 on disk h appears through the opening b which is marked "Spades". This insures that the number of dial e which then appears through opening c will differ from the previously-appearing number by an increment corresponding to the value of one trick in spades; as all the characters marked on disks h and e are prearranged to effect this result, as is accurately shown in Fig. 1, right, particularly with respect to the characters on member h. The operation just described also provides a registry of the total score for total games, visible through opening d (Fig. 1, left) in face-piece a, thus. The insertion of the operating point q through k results in its engagement in one of an annular series of inner peripheral openings $m'$ in a totalizing ring or registering member f operated concentrically with disks h and e on rollers t engaging its outer periphery. This result of such engagement is of course because of the intermediate location of opening k with respect to openings m and $m'$. Ring f has an annular series of numbers, increasing by two, to one hundred, and when this ring f is turned, these numbers appear through opening d (Fig. 1, left) in face-piece a, simultaneously with the appearance through opening c of the numbers on member e. As soon as pointer or button q is removed from opening k, spring n returns disk h to its initial position. To insure a return to its exact initial position, arm i of disk h engages with a downwardly projecting lug o in casing a (Fig. 1, left). After a single game (comprising, possibly, a plurality of hands) has been completed, disk e may be put back to its initial position by member q coöperating through slot j with one of the openings g in the disk e. Only a few openings g are needed for this purpose, but they may be used throughout the circumference, as shown, to coöperate with suitable alining means, to be described. After the points score of a single hand is registered as above in both openings c and d, the honors are scored, thus. The point q is inserted in opening l (Fig. 1, right) in arm i of disk h, which opening is offset from opening k, radially and circumferentially, so that member q engages only an opening $g'$ in ring f. Disk h is turned until, say, the spade pip on disk h appears in an opening $b'$ marked for the particular combination of honors to be scored, for example, "3 honors" (Fig. 1, left). This operation adds the honor score of a hand to the total score in opening d, entirely independently of the point score of a game in opening c. A retaining spring may be attached to the under side of casing a at $m^4$ (Fig. 1, left), the spring having projections $m^2$, $m^3$ to engage holes g and $g'$ of the dial e and ring f to prevent accidental rotation and insure exact alinement and registration mutually between m and $m'$, and between numbers on members e and f and openings c and d. This spring also presses parts c and f down upon the bearing screws $e'$ and $f'$, Fig. 2, right.

For registering the total score when the total increases beyond the capacity of ring f, a hundreds wheel p, or third registering member, is rotatably mounted in casing a so that the figures marked on it will appear through opening $d'$ at the left of opening d. Wheel p has teeth s, one of which appears through opening u (Fig. 1, left) in face-piece a, so that member q can engage it to register separate scores of a value of one hundred. Also a projection r (Fig. 1, right) on ring f may engage a tooth s to automatically register one hundred as often as ring f makes a complete rotation.

For convenience in registering the number of rubbers completed and the numbers of games won in the rubber being played, a wheel x or fourth registering member may, if desired, be rotatably mounted in the casing so that the figures marked upon it will appear through openings v in face-piece a. Wheel x has teeth y one of which appears through slot z in face-piece a so that member q can engage it to rotate it in either direction as required. This additional registering means may be used as follows: The side scoring the first game advances wheel x one division showing 0—1. If the same side scores the second game (and therefore the rubber) they advance it another division showing 1—0. If however the opponents should win the second game the score would be made 0—1 in each indicator. Then when the third game was completed, one party advances wheel x to show 1—0, and the other must move theirs back to 0—0. After a rubber, or a series of rubbers, has been played, ring f may be put back to its initial position by member q coöperating through slot j with one of the openings $g'$ in ring f. Openings g and $g'$ are preferably spaced circumferentially between openings m and $m'$, in order to preclude the possibility of member q slipping from g to m, or $g'$ to $m'$.

The practical value of the device consists largely in the fact that at all times a total register of both the points score of a single game, and of the point and honor score of the total games, appear through openings c and d respectively, thus obviating the long delays at present involved in the summation of the various individual scores before the result of the play can be determined, and the possible errors in such summation.

For use with other games, the device may be modified, as by omission of some features in cases of games with simpler modes of scoring; but the principles of the invention, as hereinafter claimed, are applicable to various uses. Also, the mode of operating the parts disclosed may be reversed, as by simultaneously moving face-piece *a* and registering member *e* with respect to a stationary condition of indicating member *h*, the registering opening *c* being in such case in a part of the casing other than the movable part having the indicating opening *b*, *b'*, and spring *n* being arranged to coöperate with the operating face-piece *a*.

The word "opening" used herein with reference to *b*, *b'*, *c*, *d* and *d'* means simply the function of such features which permits inspection of the characters, and includes all equivalents such as similarly located portions consisting of transparent material. The word "opening" used herein with reference to *g*, *g'*, *m* and *m'* means simply any device permitting the operating engagement at will between a registering member and an operating means, such as the means for the simultaneous operation of the registering member and the other movable member.

The invention, although shown in an embodiment specifically designed as a game-scoring device, may be used for other purposes, which, although possibly specifically different, may be substantially for the purpose described; and we claim the invention for all the uses to which it may be adapted.

We claim:

1. In a device for substantially the purpose described, the combination with a member having a plurality of indicating openings; of a second member bearing indicating characters arranged to appear through said indicating openings; a third member bearing registering characters; openings in said first member for rendering visible a desired portion of the registering characters; two of said three members being simultaneously operable to cause the indicating characters to appear as desired through said indicating openings in said first member; said indicating and registering characters being prearranged on their respective members to cause a definite portion of the registering characters to be visible when one of the indicating characters is moved to appear through a corresponding indicating opening.

2. In a device for substantially the purpose described, the combination with a member having a plurality of indicating openings; of a second member bearing a plurality of series of indicating numbers arranged so that all the numbers of each series may successively appear through an indicating opening corresponding to such series; a third member bearing registering characters; openings in said first member for rendering visible a desired portion of the registering characters; two of said three members being simultaneously operable to cause the indicating numbers to appear as desired through said indicating openings in said first member; said indicating and registering numbers being prearranged on their respective members to cause a definite portion of the registering numbers to be visible when one of the indicating members is moved to appear through a corresponding indicating opening.

3. In a device for substantially the purpose described, the combination with a member having a plurality of indicating openings; of a second member bearing a plurality of sets of trump indicating characters arranged so that all the characters of each set may successively appear through an indicating opening corresponding to such set; a third member bearing registering characters; openings in said first member for rendering visible a desired portion of the registering characters; two of said three members being simultaneously operable to cause the trump indicating characters to appear as desired through said indicating openings in said first member; said trump indicating characters and registering characters being prearranged on their respective members to cause a definite portion of the registering characters to be visible when one of the trump indicating characters is moved to appear through a corresponding indicating opening.

4. In a device for substantially the purpose described, the combination with a member having a plurality of indicating openings for suits and honors respectively; of a second member bearing a plurality of series of indicating numbers and a plurality of sets of trump indicating characters; the numbers of each numerical series being arranged to appear successively through one of the suit-indicating openings, and the characters of each trump indicating set being arranged to appear successively through one of the honor-indicating openings; a third and fourth member each bearing registering characters; openings in said first member for rendering visible desired portions of the characters of the respective registering members; either and both of said registering members being operable simultaneously with one of the other two members to cause the indicating characters to appear as desired through said indicating openings in said first member; said indicating and registering characters being prearranged on their respective members to cause a definite portion of the registering characters of each member to be visible when one of the indicating characters is moved to appear through a specific indicating opening.

5. In a device for substantially the purpose described, the combination with a member having a plurality of indicating openings for suits and honors respectively; of a second member bearing a plurality of series of indicating numbers and a plurality of sets of trump indicating characters; the numbers of each numerical series being arranged to appear successively through one of the suit-indicating openings, and the characters of each trump indicating set being arranged to appear successively through one of the honor-indicating openings; a third and fourth member each bearing registering characters; means in said first member for rendering visible desired portions of the characters of the respective registering members; either and both of said registering members being operable simultaneously with one of the other two members to cause the indicating characters to appear as desired through said indicating openings in said first member; said indicating and registering characters being prearranged on their respective members to cause a definite portion of the registering characters of each registering member to be visible when one of the indicating characters is moved to appear through a corresponding indicating opening; all in combination with a third registering member operable by one of the other registering members.

6. In a device for substantially the purpose described, the combination with a registering member bearing recording characters and having a plurality of operating openings; of an operating member; and a third member; said third and operating members being provided, one with prearranged indicating characters, and the other with prearranged indicating openings; means for simultaneously operating the registering member and one of the other members; and means for permitting ready inspection of a proper registering character through the member having the indicating openings.

7. In a device for substantially the purpose described, the combination with a face-piece having a registering opening, a plurality of indicating openings and an operating slot, of a recording member bearing registering characters and having a plurality of operating openings registering with said slot; an operating member bearing a plurality of indicating characters coöperating with the indicating openings in said face-piece; and means coöperating with said operating member and said openings in the registering member to permit the simultaneous operation of both members and move said registering characters under said registering opening.

8. In a device for substantially the purpose described, the combination with a face-piece having a registering opening, a plurality of indicating openings, and an operating slot; of a registering member bearing recording characters, and having a plurality of operating openings registering with said slot; and an operating member having an opening registering with said operating openings in the registering member and bearing a plurality of indicating characters coöperating with the indicating openings in said face-piece.

9. In a device for substantially the purpose described, the combination with a registering member bearing recording characters and having a plurality of operating openings; of an operating member; and a third member; said third and operating members being provided, one with prearranged indicating characters, and the other with prearranged indicating openings; means for simultaneously operating the registering member and one of the other members; a spring located and arranged to return the last-named member to its initial position after each operation; and means for permitting ready inspection of a proper registering character through the member having the indicating openings.

10. In a device for substantially the purpose described, the combination with two registering members located in substantially the same plane, each bearing registering characters, and each having adjacent openings, substantially at the edges; of means for operating both registering members simultaneously, and, at will, operating one registering member alone.

11. In a device for substantially the purpose described, the combination with two registering members located in substantially the same plane, each bearing registering characters, and each having adjacent openings substantially at the edges; means for operating both registering members simultaneously; a third recording member bearing registering characters; and means whereby one of said first two registering members operates said third recording member.

12. In a device for substantially the purpose described, the combination with two registering members located in substantially the same plane, each bearing registering characters, and each having adjacent openings substantially at the edges; means for operating both registering members simultaneously; a third registering member bearing registering characters; means whereby one of said first two registering members operates said third recording member; and means whereby said third recording member may be independently operated, at will.

13. In a device for substantially the purpose described, the combination with two registering members located in substantially the same plane; each bearing registering characters, and each having adjacent openings substantially at the edges; of means for operating both registering members simultaneously; a third recording member bearing registering characters; means whereby one of said first two registering members operates said third recording member; a fourth registering member, bearing recording characters; and means whereby said third and fourth registering members may be independently operated at will.

14. In a device for substantially the purpose described, the combination with two registering members located in substantially the same plane, each bearing registering characters, and having adjacent registering operating openings; of means for engaging registering pairs of said openings to simultaneously operate both registering members.

15. In a device for substantially the purpose described, the combination with registering means bearing recording characters; of simultaneously operable indicating and operating means bearing indicating characters and permitting the arbitrary selection of any one of a plurality of indicating characters all in combination with a coöperating indicating member having a plurality of indicating openings corresponding with the indicating characters on the operating number; the registering means, and the operating and indicating means, having a coöperative prearrangement of their respective registering and indicating characters which permits the production of a definite registering for each indicating operation and selection.

16. In a device for substantially the purpose described, the combination with a recording member bearing registering characters and having a plurality of operating openings; of an operating member; and a third member; said third and operating members being provided, one with prearranged indicating characters, and the other with prearranged indicating openings corresponding with said indicating characters; means for simultaneously operating the registering member and one of the other members; and means for permitting an independent operation of either the registering member and the simultaneously operable other member.

17. In a device for substantially the purpose described, the combination with a plurality of registering members each having a plurality of operating openings, means for operating each member independently of the other, an indicating member bearing a plurality of prearranged characters, and a coöperating indicating member provided with a plurality of prearranged indicating openings corresponding with said indicating characters.

CARLTON T. BISHOP.
REGINALD JACKSON.

Witnesses:
 A. S. BANAY,
 M. A. PRESTON,
 EDWARD H. PRIOR,
 LEWIS VINCENT.